United States Patent
Suzuki

(10) Patent No.: US 10,033,854 B2
(45) Date of Patent: Jul. 24, 2018

(54) VEHICLE CONTROL DEVICE

(71) Applicant: DENSO CORPORATION, Kariya, Aichi-pref. (JP)

(72) Inventor: Takamitsu Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/505,804

(22) PCT Filed: Aug. 19, 2015

(86) PCT No.: PCT/JP2015/004109
§ 371 (c)(1),
(2) Date: Feb. 22, 2017

(87) PCT Pub. No.: WO2016/038798
PCT Pub. Date: Mar. 17, 2016

(65) Prior Publication Data
US 2017/0289346 A1 Oct. 5, 2017

(30) Foreign Application Priority Data

Sep. 10, 2014 (JP) .................................. 2014-184217
Apr. 23, 2015 (JP) .................................. 2015-088495

(51) Int. Cl.
*H04W 4/02* (2018.01)
*H04M 1/725* (2006.01)
*B60N 2/00* (2006.01)

(52) U.S. Cl.
CPC ........ *H04M 1/72577* (2013.01); *B60N 2/002* (2013.01); *H04M 1/72569* (2013.01)

(58) Field of Classification Search
CPC ............ G08G 1/096791; G08G 1/052; G08G 1/0133; E05F 15/70; B60R 11/04; G05D 1/0088; B60W 30/143; B60W 2520/30
USPC .............................. 455/426.1, 418; 704/260
See application file for complete search history.

(56) References Cited

U.S. PATENT DOCUMENTS

| 2004/0004665 | A1  | 1/2004 | Kashiwa |
| 2008/0188217 | A1* | 8/2008 | Harter ............... G06Q 10/08 455/426.1 |
| 2013/0096921 | A1* | 4/2013 | Kuwamoto ......... G08G 1/0962 704/260 |

FOREIGN PATENT DOCUMENTS

| JP | H11122162 A | 4/1999 |
| JP | 2001141475 A | 5/2001 |
| JP | 2004322772 A | 11/2004 |
| JP | 2007246024 A | 9/2007 |

(Continued)

*Primary Examiner* — Phuoc H Doan
(74) *Attorney, Agent, or Firm* — Harness, Dickey & Pierce, P.L.C.

(57) ABSTRACT

A vehicle control device includes: a carry-in state determination device that determines whether a portable terminal device to be carried into a vehicle is already carried into the vehicle; a pending process determination device that, when the carry-in state determination device determines that the portable terminal device is already carried into the vehicle, determines whether the portable terminal device has a pending process that is held in an unexecuted state; and a pending process control device that, when the pending process determination device determines that the portable terminal device has the pending process, enables the pending process to be executed by the portable terminal device in the vehicle.

12 Claims, 12 Drawing Sheets

(56) References Cited

FOREIGN PATENT DOCUMENTS

| WO | WO-2012008437 A1 | 1/2012 |
| WO | WO-2014080570 A1 | 5/2014 |

* cited by examiner

FIG. 1
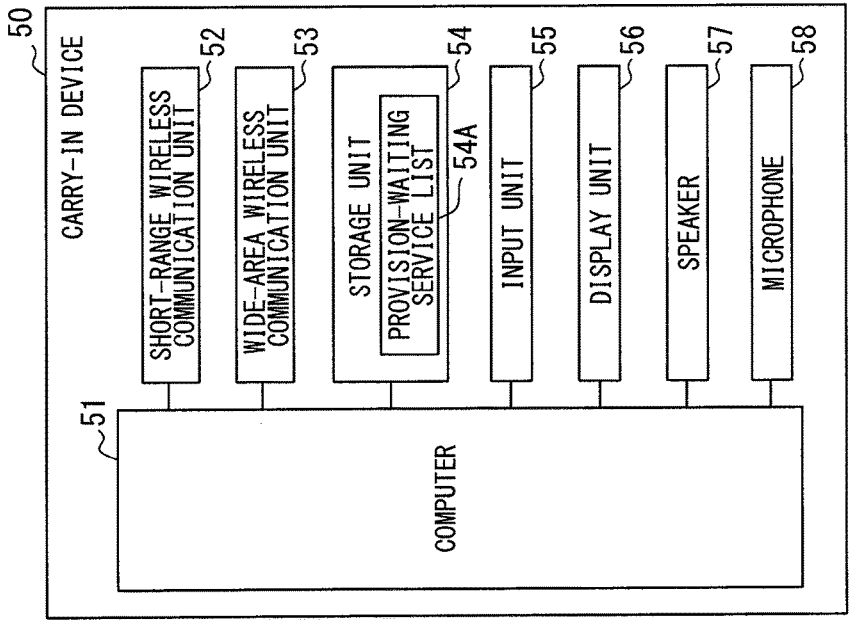
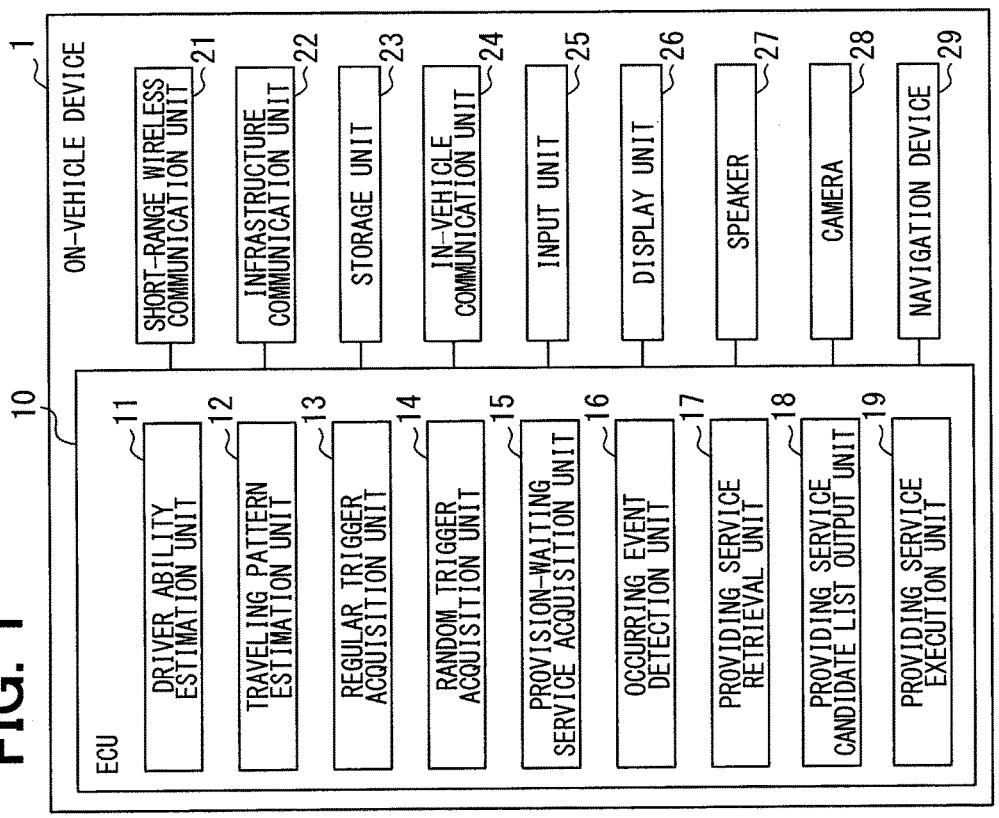

FIG. 2

REGULAR SPARE TIME LIST

| No. | REGULAR PATTERN | | SPARE TIME LIST | | | |
|---|---|---|---|---|---|---|
| | ORIGIN-DESTINATION | DATE/TIME PERIOD | OCCURRING TRIGGER | OCCURRING TIMING | DURATION | DRIVING STATE |
| 1 | HOME-COMPANY | WEEKDAY/AROUND 6:00 AM | DECELERATE TO YY km/h OR LESS AFTER PASSING THROUGH ZZ TOWN INTERSECTION | 10 MIN AFTER DEPARTURE | 3 TO 5 MIN | LOW-SPEED TRAVELING OF 10 km/h OR LESS |
| | | | STOP NEARLY WW m BEFORE XX RAILROAD CROSSING | 25 MIN AFTER DEPARTURE | 2 TO 3 MIN | STOPPING |
| | | | ... | ... | ... | ... |
| 2 | COMPANY-RR WAREHOUSE | WEDNESDAY/AROUND PM 3:00 | PASS THROUGH TT INTERCHANGE AND ACCELERATE TO SS km/h OR MORE | 35 MIN AFTER DEPARTURE | 30 MIN | CONSTANT-SPEED TRAVELING OF 80 km/h |
| | | | ... | ... | ... | ... |
| | | | ARRIVE AT PARKING OF RR WAREHOUSE | 90 MIN AFTER DEPARTURE | 5 TO 10 MIN | PARKING |
| ... | ... | | ... | ... | ... | ... |

FIG. 3

PROVING SERVICE CANDIDATE LIST

| PROVISION-WAITING SERVICE | PRIORITY | LOAD OF DRIVER | | | REQUIRED TIME |
|---|---|---|---|---|---|
| | | COGNITION | JUDGEMENT | OPERATION | |
| MISSED CALL FROM Q | A | 2 | 1 | 0 | 10 MIN |
| MISSED CALL FROM P | A | 2 | 1 | 0 | 1 MIN |
| UNREAD EMAIL (100 CHARACTERS) | C | 2 | 1 | 2 | 10 SEC |
| NEW NEWS (600 CHARACTERS) | D | 1 | 0 | 0 | 1 MIN |
| ⋮ | ⋮ | ⋮ | ⋮ | ⋮ | ⋮ |

FIG. 4

SERVICE-CLASSIFIED DRIVER LOAD LIST

| PROVIDING SERVICE | SERVICE | | LOAD OF DRIVER | | | |
|---|---|---|---|---|---|---|
| | CARRY-IN DEVICE EVENT | PRIORITY | COGNITION | JUDGMENT | OPERATION | REMARKS |
| TELEPHONE CONVERSATION | MISSED CALL | A | 2 | 1 | 0 | (1) CONVERSATION |
| LISTENING OF MESSAGE LEFT ON ANSWERING MACHINE | MESSAGE LEFT ON ANSWERING MACHINE | B | 2 | 0 | 0 | (1) READING VOICE LISTENING<br>(2) CORRESPONDENCE DETERMINATION ACCORDING TO CONTENTS |
| EMAIL READING | ARRIVAL OF EMAIL | C | 2 | 1 | 2 | (1) READING VOICE LISTENING<br>(2) CORRESPONDENCE DETERMINATION ACCORDING TO CONTENTS<br>(3) REPLY MAIL CREATION<br>(4) REPLAY MAIL TRANSMISSION |
| NEWS READING | ARRIVAL OF NEW NEWS | D | 1 | 0 | 0 | (1) READING VOICE LISTENING |
| ... | ... | ... | ... | ... | ... | ... |

FIG. 5

DRIVING-STATE-CLASSIFIED DRIVER LOAD LIST

| DRIVING STATE | LOAD OF DRIVER | | |
|---|---|---|---|
| | COGNITION | JUDGEMENT | OPERATION |
| PARKING | 0 | 0 | 0 |
| STOPPING | 1 | 1 | 0 |
| ORDINARY ROAD & LOW-SPEED TRAVELING OF 10 km/h OR LESS | 3 | 3 | 2 |
| EXPRESSWAY & CONSTANT-SPEED TRAVELING OF 70-90 km/h | 2 | 2 | 2 |
| ⋮ | ⋮ | ⋮ | ⋮ |

FIG. 9

DRIVING-STATE-CLASSIFIED DRIVER LOAD LIST

| DRIVING SUPPORT LEVEL | 0 | | | 1 | | | ... | 5 | | |
|---|---|---|---|---|---|---|---|---|---|---|
| | LOAD OF DRIVER | | | LOAD OF DRIVER | | | | LOAD OF DRIVER | | |
| DRIVING STATE | COGNITION | JUDGEMENT | OPERATION | COGNITION | JUDGEMENT | OPERATION | ... | COGNITION | JUDGEMENT | OPERATION |
| PARKING | 0 | 0 | 0 | 0 | 0 | 0 | ... | 0 | 0 | 0 |
| STOPPING | 1 | 1 | 0 | 1 | 0 | 0 | ... | 0 | 0 | 0 |
| ORDINARY ROAD & LOW-SPEED TRAVELING OF 10 km/h OR LESS | 3 | 3 | 2 | 2 | 2 | 1 | ... | 0 | 0 | 0 |
| ORDINARY ROAD & LOW-SPEED TRAVELING OF 10 km/h OR LESS | 2 | 2 | 2 | 1 | 1 | 1 | ... | 0 | 0 | 0 |
| ... | ... | ... | ... | ... | ... | ... | ... | ... | ... | ... |

VEHICLE CONTROL DEVICE

CROSS REFERENCE TO RELATED APPLICATIONS

This application is a U.S. National Phase Application under 35 U.S.C. 371 of International Application No. PCT/JP2015/004109 filed on Aug. 19, 2015 and published in Japanese as WO 2016/038798 A1 on Mar. 17, 2016. This application is based on and claims the benefit of priority from Japanese Patent Applications No. 2014-184217 filed on Sep. 10, 2014, and No. 2015-88495 filed on Apr. 23, 2015. The entire disclosures of all of the above applications are incorporated herein by reference.

TECHNICAL FIELD

The present disclosure relates to a vehicle control device that controls the execution of a process in a portable terminal device carried into a vehicle.

BACKGROUND ART

In recent years, portable terminal devices such as a smartphone (multifunctional cellular phone) and a tablet terminal have rapidly become widespread and increased in functionality. Thus, it is indispensable to acquire information from these devices in daily life. However, in view of safety, it may be undesirable that a driver operate these portable terminal devices without any restriction while driving a vehicle. Thus, there has been proposed a technique that restricts the operation of a portable terminal device by a driver during a ride in the vehicle. For example, there has been proposed a technique that executes control for prohibiting part of the operation of the portable terminal device or converting character data into voice data according to, for example, a traveling state of a vehicle (refer to Patent Literature 1, for example).

However, the configuration described in Patent Literature 1 is a configuration for performing enable/disable setting of an operation or conversion of data with respect to information received during driving of the vehicle. Thus, when the configuration described in Patent Literature 1 is merely employed, a driver may not be able to sufficiently utilize time during a ride in the vehicle for the operation to the portable terminal device. That is, people of today find a short free time (hereinbelow, also referred to as a spare time) to operate portable terminal devices. However, in the configuration of Patent Literature 1, even when there is a time during which the portable terminal device can be operated during a ride in the vehicle, it is not possible to actively tell a driver the generation of the time. Thus, for example, it may not be possible for a driver to sufficiently execute the operation of the portable terminal device, which has been made pending since before the driver gets into the vehicle, by utilizing time during a ride in the vehicle.

PRIOR ART LITERATURES

Patent Literature

Patent Literature 1: JP-H11-122162-A

SUMMARY OF INVENTION

It is an object of the present disclosure to provide a vehicle control device that enables a driver to execute a pending operation of a portable terminal device by utilizing time during a ride in a vehicle.

According to an aspect of the present disclosure, a vehicle control device includes: a carry-in state determination device that determines whether a portable terminal device to be carried into a vehicle is already carried into the vehicle; a pending process determination device that, when the carry-in state determination device determines that the portable terminal device is already carried into the vehicle, determines whether the portable terminal device has a pending process that is held in an unexecuted state; and a pending process control device that, when the pending process determination device determines that the portable terminal device has the pending process, enables the pending process to be executed by the portable terminal device in the vehicle.

In the above vehicle control device, when a portable terminal device that has a pending process that is held in an unexecuted state is carried into the vehicle, the carry-in state determination device determines that the portable terminal device has been carried into the vehicle, and the pending process determination device determines that the portable terminal device has the pending process. Then, the pending process control device enables the pending process to be executed by the portable terminal device in the vehicle.

That is, the vehicle control device actively determines the presence or absence of a pending process in the portable terminal device, and the execution of the pending processing is enabled according to a result of the determination. Thus, for example, immediately after a driver carries the portable terminal device having a pending process into the vehicle (at this time, the vehicle is in a stopped state), the driver can execute the pending process in the portable terminal device, that is, an operation with respect to the potable terminal device that has been made pending by the driver. Since the inside of the vehicle is an excellent private space, the driver can excellently execute the operation of the portable terminal device relating to the pending process.

In the above vehicle control device, the pending process control device may enable the execution of the pending process when the pending process is allowable for, for example, a traveling state of the vehicle. In this case, since the pending process that is allowable for the traveling state or the like of the vehicle is executed, the safety in the travel by the vehicle can also be excellently ensured.

BRIEF DESCRIPTION OF DRAWINGS

The above and other objects, features and advantages of the present disclosure will become more apparent from the following detailed description made with reference to the accompanying drawings. In the drawings:

FIG. 1 is a block diagram illustrating the configuration of an on-vehicle device and the configuration of a carry-in device of a first embodiment;

FIG. 2 is an explanatory diagram illustrating the configuration of a regular spare time list used in the on-vehicle device;

FIG. 3 is an explanatory diagram illustrating the configuration of a providing service candidate list used in the on-vehicle device;

FIG. 4 is an explanatory diagram illustrating the configuration of a service-classified driver load list used in the on-vehicle device;

FIG. 5 is an explanatory diagram illustrating the configuration of a driving-state-classified driver load list used in the on-vehicle device;

FIG. 9 is an explanatory diagram illustrating a driving-state-classified driver load list used in the on-vehicle device of the second embodiment;

EMBODIMENTS FOR CARRYING OUT INVENTION

Figure 6:
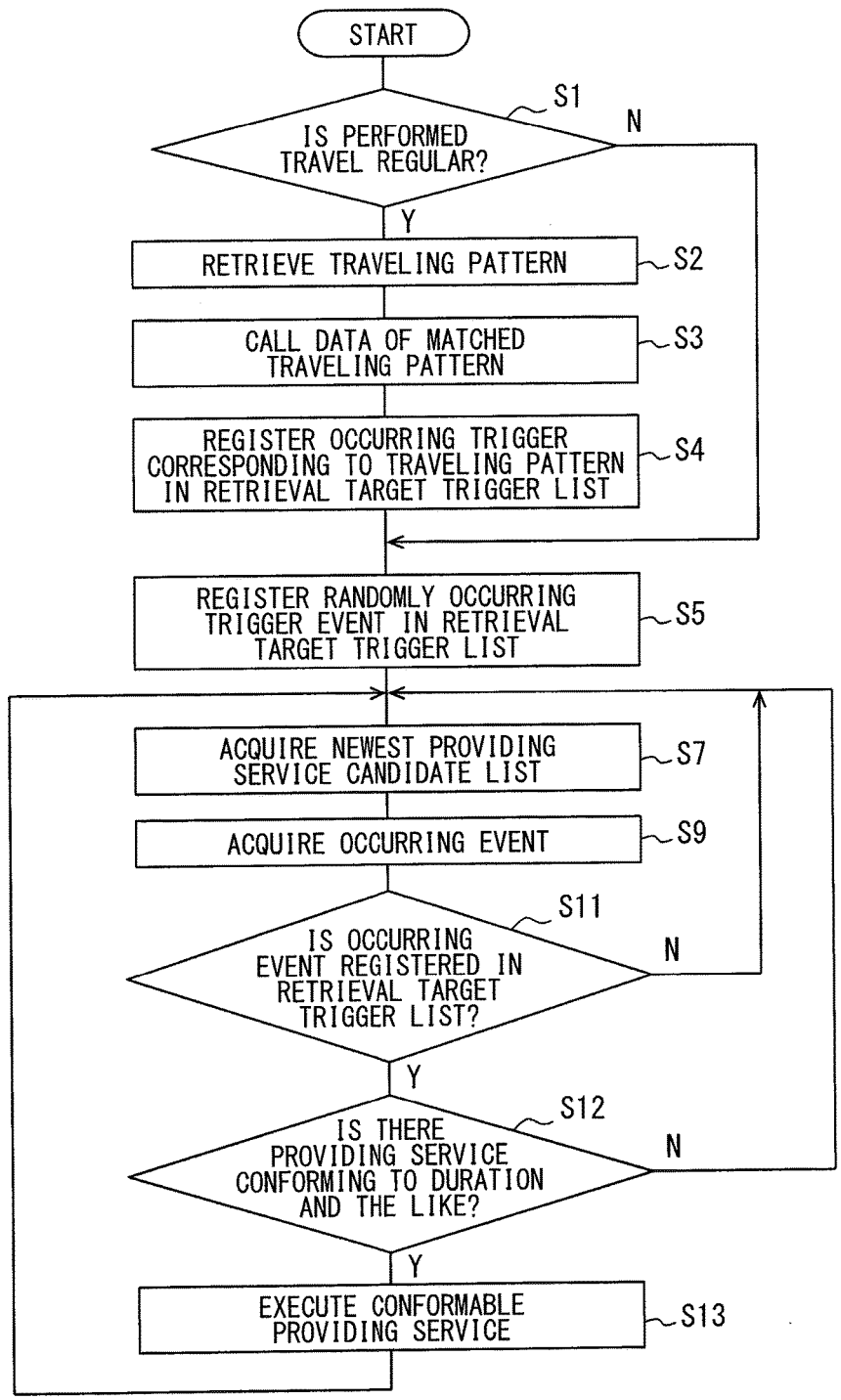
FIG. 6 is a flow chart illustrating a process in the on-vehicle device as a whole.

Hereinbelow, embodiments to which the present disclosure is applied will be described with reference to the drawings.

1. First Embodiment

[1-1. Configuration of ON-Vehicle Device]

An on-vehicle device 1 illustrated in FIG. 1 as an example of a vehicle control device is mounted on a vehicle (not illustrated). The on-vehicle device 1 is provided with an ECU 10, a short-range wireless communication unit 21, an infrastructure communication unit 22, a storage unit 23, an in-vehicle communication unit 24, an input unit 25, a display unit 26, a speaker 27, a camera 28, and a navigation device 29.

The short-range wireless communication unit 21 performs short-range wireless communication with a carry-in device 50 such as a smartphone according to communication standards such as Bluetooth and WiFi (registered trademarks). The infrastructure communication unit 22 performs, for example, road-vehicle communication with infrastructural facilities such as a traffic light and a railroad crossing. The infrastructure communication unit 22 may perform communication by radio waves or communication using, for example, an infrared beacon. The storage unit 23 rewritably stores various pieces of information such as various lists (described below) therein and holds the stored contents even when power of the vehicle on which the on-vehicle device 1 is mounted is off. The in-vehicle communication unit 24 performs communication with an on-vehicle LAN (not illustrated) to acquire an operating state of an accelerator or a brake, a vehicle speed, and the like.

The input unit 25 and the display unit 26 are provided as a touch panel display which is provided relating to the navigation device 29. The input unit 25 receives an input from a driver. The display unit 26 performs information display to a driver. The speaker 27 notifies a driver of information with a voice. The speaker 27 may also serve as a speaker of an audio device (not illustrated) or may be used for information notification by the navigation device 29. The camera 28 is disposed inside a cabin of the vehicle to capture an image of the face of a driver. The navigation device 29 is provided with map data and a position detection device which uses, for example, a global navigation satellite system (GNSS). The navigation device 29 acquires the position of the own vehicle on a map and displays the map and the position of the own vehicle on the display unit 26 as necessary. When a destination is designated through the input unit 25, the navigation device 29 calculates a traveling route to the destination.

The ECU 10 is configured as a microcomputer which includes a CPU, a ROM, and a RAM and is provided with the following various processing units. Each of the following processing units may be configured as a processing unit provided with an independent CPU or may be configured as, for example, a subroutine of processing executed by the same CPU. The ECU 10 is provided with, as processing units, a driver ability estimation unit 11, a traveling pattern estimation unit 12, a regular trigger acquisition unit 13, a random trigger acquisition unit 14, a provision-waiting service acquisition unit 15, an occurring event detection unit 16, a providing service retrieval unit 17, a providing service candidate list output unit 18, and a providing service execution unit 19.

The driver ability estimation unit 11 estimates the ability of a driver on the basis of, for example, an image of the face of the driver captured by the camera 28 or an operating state of the brake acquired by the in-vehicle communication unit 24. Specifically, the driver ability estimation unit 11, for example, estimates the driving ability of a driver by taking into consideration all elements such as the age and gender of the driver, a movement of the line of sight, and whether there is impatience during a brake operation. The driver ability estimation unit 11 estimates the ability of a driver on the basis of whether a value representing a load that is allowable for the ability (hereinbelow, also referred to as an allowable value: an example of a first numerical value) is any of integers of 6 to 3. The allowable value is individually estimated with respect to each of abilities relating to the cognition, judgment, and operation of a driver. For example, in the case of a driver who is experienced and physically and mentally mature, and has a high level of physical ability, each of the allowable values for the cognition, judgment, and operation is estimated as 6. On the other hand, in the case of a beginner who has little experience or an old-old person who has a decline in reflexes or a visual ability, each of the allowable values is estimated as 3.

The traveling pattern estimation unit 12 estimates a traveling pattern of the vehicle on the basis of a departure place of the vehicle acquired through the navigation device 29 and a departure time (day and time) of the vehicle. Specifically, the traveling pattern estimation unit 12 determines whether the departure place and the departure time of the vehicle correspond to any of regular traveling patterns (hereinbelow, also referred to as regular patterns). More specifically, the traveling pattern estimation unit 12 refers to, for example, a regular spare time list as illustrated in FIG. 2 which is stored in the storage unit 23 to determine whether the departure place and the departure time match any of the regular patterns. The regular spare time list may be automatically created on the basis of a traveling history of the vehicle by a separate routine (not illustrated) or may be created on the basis of an input by the driver.

When the traveling pattern estimation unit 12 determines that the departure place and the departure time of the vehicle match any of the regular patterns, the regular trigger acquisition unit 13 acquires an occurring trigger that corresponds to the regular pattern. For example, when the traveling pattern estimation unit 12 determines that the departure place and the departure time match a regular pattern of No. 1 in the regular spare time list illustrated in FIG. 2, an occurring trigger of "DECELERATE TO YYkm/h OR LESS AFTER PASSING THROUGH ZZ TOWN INTERSECTION" is acquired.

The random trigger acquisition unit 14 acquires a trigger that randomly occurs regardless of whether the traveling pattern is a regular pattern. Specifically, stopping at an intersection where a traffic light has just changed to red, stopping performed when the vehicle has caught up with the tail end of a traffic jam, or a state in which the vehicle starts travelling at a constant speed after having entered a main lane of an expressway is acquired as an occurring trigger.

The provision-waiting service acquisition unit 15 attempts to communicate with the carry-in device 50 through the short-range wireless communication unit 21 to determine whether the carry-in device 50 has been carried into a vehicle cabin. The provision-waiting service acquisition unit 15 communicates with the carry-in device 50 through the short-range wireless communication unit 21 to acquire information of a provision-waiting service (an example of a pending process) that is held in an unexecuted state in the carry-in device 50.

The providing service candidate list output unit 18 creates a providing service candidate list for the information of the provision-waiting service acquired by the provision-waiting service acquisition unit 15 and stores the created list in the storage unit 23. As illustrated in FIG. 3, for example, the providing service candidate list is created by associating the names of provision-waiting services, priorities of these services, loads imposed on a driver by the execution of these services (that is, the loads required for the driver to execute these services), predicted required time which is required for the execution of these services with each other. The storage unit 23 stores, for example, a service-classified driver load list as illustrated in FIG. 4 therein. The service-classified driver load list stores a load, which is imposed on a driver by the execution of each service (process in the carry-in device 50), for each of items of cognition, judgment, and operation in a numerical value (an example of a third numerical value). The service-classified driver load list stores the priority of each service settably by a driver. The required time required for the execution of each service is predictable to some extent according to the number of characters in an email or news, or the person at the other end of the line in a telephone conversation (call log). The providing service candidate list output unit 18 creates a providing service candidate list by taking all these pieces of information into consideration.

The service-classified driver load list is also intended to the case in which a plurality of operations are required for a driver such as listening of a reading voice and correspondence determination according to the contents in listening of a message left on an answering machine as illustrated in a remarks column of FIG. 4. When the carry-in device 50 has a provision-waiting service, but the provision-waiting service is not registered in the service-classified driver load list, the provision-waiting service is excluded from the providing service candidate list as a service that cannot be executed during a ride in the vehicle.

The occurring event detection unit 16 acquires, for example, an operating state of a brake pedal and a parking brake and a vehicle speed through the in-vehicle communication unit 24 to detect an occurring event such as parking, stopping, low-speed traveling of 10 km/h or less, or constant-speed traveling of 70 to 90 km/h. The occurring event detection unit 16 uses information from the navigation device 29 to detect, for example, whether the stopping is caused by a traffic light or a railroad crossing or detect whether the travel is on an ordinary road or on an expressway. Further, the occurring event detection unit 16 detects a duration of the stopping caused by a traffic light or the stopping caused by a railroad crossing. The occurring event detection unit 16 also detects a duration of a driving state such as "constant-speed traveling on an expressway" by referring to the map data in the navigation device 29 or communicating with the Japan Road Traffic Information Center (registered trademark) or the like through the infrastructure communication unit 22.

The providing service retrieval unit 17 compares the occurring event detected by the occurring event detection unit 16 with the providing service candidate list created by the providing service candidate list output unit 18 to retrieve a service that should be executed by the carry-in device 50. Specifically, the storage unit 23 stores, for example, a driving-state-classified driver load list as illustrated in FIG. 5 therein. The driving-state-classified driver load list stores a load, which is imposed on a driver by a driving state such as parking, stopping, low-speed traveling of 10 km/h or less on an ordinary road, or constant-speed traveling of 70 to 90 km/h on an expressway, for each of items of cognition, judgment, and operation in a numerical value (an example of a second numerical value). Thus, the load imposed on a driver by a driving state according to an occurring event is acquired, and the duration of the driving state is also detected in the above manner. The load imposed on a driver by each service is also acquired from the service-classified driver load list (refer to FIG. 4) or the providing service candidate list (refer to FIG. 3). Thus, the providing service retrieval unit 17 retrieves a service that satisfies the following conditions: the duration of the occurring event is shorter than the required time of the service; and the sum of the load relating to the occurring event and the load relating to the service is equal to or less than the allowable value of the driver.

The providing service execution unit 19 instructs the carry-in device 50 to execute the service retrieved by the providing service retrieval unit 17 through the short-range wireless communication unit 21. The providing service execution unit 19 deletes the service whose execution has been completed from the providing service candidate list.

[1-2. Configuration of Carry-in Device]

The carry-in device 50 may be any device that is carried into a vehicle cabin by a driver such as a smartphone, other cellular phones, a tablet terminal, or a notebook computer. Hereinbelow, the carry-in device 50 will be described as a smartphone. The carry-in device 50 is provided with a computer 51, a short-range wireless communication unit 52, a wide-area wireless communication unit 53, a storage unit 54, an input unit 55, a display unit 56, a speaker 57, and a microphone 58.

The short-range wireless communication unit 52 performs wireless communication with the short-range wireless communication unit 21 of the on-vehicle device 1 according to communication standards such as Bluetooth and WiFi (registered trademarks). The wide-area wireless communication unit 53 performs communication through a telephone line or the Internet. The storage unit 54 stores various pieces of information required for general processes in smartphones therein. In the present embodiment, the storage unit 54 is provided with a provision-waiting service list 54A which stores provision-waiting services in the form of a list.

The input unit 55 receives various inputs by an owner (e.g., a driver). The display unit 56 performs various information displays to the owner. The input unit 55 and the display unit 56 may be integrally configured as a touch panel display.

The speaker 57 reads an email or news to the owner with a voice and generates a voice generated by the person at the other end of the line during a telephone conversation. The microphone 58 detects a voice generated by the owner during a telephone conversation. A hands-free microphone or a speaker for telephone may be attached to the carry-in device 50.

The computer 51 is configured as a microcomputer provided with a CPU, a ROM, and a RAM. The computer 51 executes the same processing as a typical smartphone except the following two differences. One of the differences is that provision-waiting services are listed and stored in the provision-waiting service list 54A. The other difference is that a process (that is, a provision-waiting service) is executed according to an instruction from the providing service execution unit 19 in the on-vehicle device 1.

[1-3. Process]

The ECU 10 of the on-vehicle device 1 executes a process as illustrated in FIG. 6 as a whole. The process illustrated in FIG. 6 is started when a driver gets into the vehicle and turns on a power switch of the vehicle. In the process, it is first determined whether a travel of the vehicle that is going to be performed from now on is a regular travel on the basis of a processing result of the traveling pattern estimation unit 12 in S1 (S denotes a step, the same applies to the following description). When the travel is a regular travel (S1: Y), to which regular pattern the traveling pattern corresponds is retrieved in S2.

In the following S3, data such as an occurring trigger relating to the regular pattern retrieved in S2 is read from the regular spare time list through the regular trigger acquisition unit 13. In S4, the occurring trigger corresponding to the regular pattern is registered in a retrieval target trigger list. The retrieval target trigger list registers therein an occurring event to be a trigger of the process relating to the carry-in device 50 among various occurring events detected by the occurring event detection unit 16. This process facilitates the detection of an occurring trigger that occurs in a regular travel (that is, a driving state that generates a spare time).

In the following S5, a trigger that randomly occurs regardless of whether a traveling pattern is a regular pattern (a trigger acquired by the random trigger acquisition unit 14) is registered in the retrieval target trigger list. When it is determined that the travel of the vehicle is not a regular travel in S1 (S1: N), the process directly shifts from S1 to S5.

When the registration of the occurring event in the retrieval target trigger list is completed in S5, the process shifts to S7, and the newest providing service candidate list is acquired. The providing service candidate list is updated at any time in the step described below.

In the following S9, an occurring event detected by the occurring event detection unit 16 is acquired. In S11, it is determined whether the acquired occurring event is an occurring event registered in the retrieval target trigger list. When the occurring event acquired in S9 is not an occurring event registered in the retrieval target trigger list (S11: N), the process shifts to S7. When the acquired occurring event is an occurring event registered in the retrieval target trigger list (S11: Y), the process shifts to S12. In S12, it is determined whether there is a service that conforms to the duration and the like of the occurring event with reference to a processing result of the providing service retrieval unit 17.

In this process, it is determined whether, in the providing service candidate list, there is a service that satisfies the following conditions: the duration of the occurring event acquired in S9 is longer than the required time of the service; and the sum of a load relating to the occurring event and a load relating to the service is equal to or less than the allowable value of the driver. That is, a value obtained by subtracting the load relating to the occurring event (driving state) from the allowable value of the driver is a load (ability) that can be safely applied to operations other than driving by the driver. Thus, the presence or absence of a service whose load imposed on the driver is within the range that can be safely applied in all of the cognition, judgment, and operation and whose required time is shorter than the duration of the occurring event is determined in S12. When a driving state corresponding to the occurring event is not included in the driving-state-classified driver load list in FIG. 5, a service that conforms to the driving state is considered to be absent.

When there is no service that conforms to the duration and the like in the providing service candidate list (S12: N), the process shifts to S7. When there is a service that conforms to the duration and the like in the providing service candidate list (S12: Y), the process shifts to S13. In S13, the providing service execution unit 19 instructs the carry-in device 50 to execute a service (process) having the highest priority among services that are registered in the providing service candidate list and that conform to the duration and the like, and the process shifts to S7.

Here, an example of the above process will be described. For example, when the vehicle travels with the regular pattern of No. 1 in the regular spare time list illustrated in FIG. 2 (S1: Y), the vehicle is highly likely to stop near WW m before the XX railroad crossing after 25 minutes from the departure. Assume that stopping of the vehicle is actually detected as an occurring event at the above time and in the above place (S11: Y), and the duration of the stopping is determined to be 2 minutes by communication by the occurring event detection unit 16 through the infrastructure communication unit 22. Further, assume that, at this time, an allowable value estimated by the driver ability estimation unit 11 is "3" for each of the cognition, judgement, and operation, and the providing service candidate list is set as illustrated in FIG. 3. In this case, the loads relating to the stopping are 1, 1, and 0 respectively for the cognition, judgement, and operation as illustrated in FIG. 5. Thus, the load of each item is 3 or less even when added to the load relating to any of the services illustrated in FIG. 3. Thus, all the services are executable only in view of load. However, since the duration of the stopping is 2 minutes, a service relating to a missed call from Q is unexecutable. Thus, services except the service relating to the missed call from Q are determined to be providing services that conform to the duration and the like (S12: Y). As a result, the execution of the service relating to a missed call from P which has the highest priority is instructed to the carry-in device 50 in S13.

Figure 7:
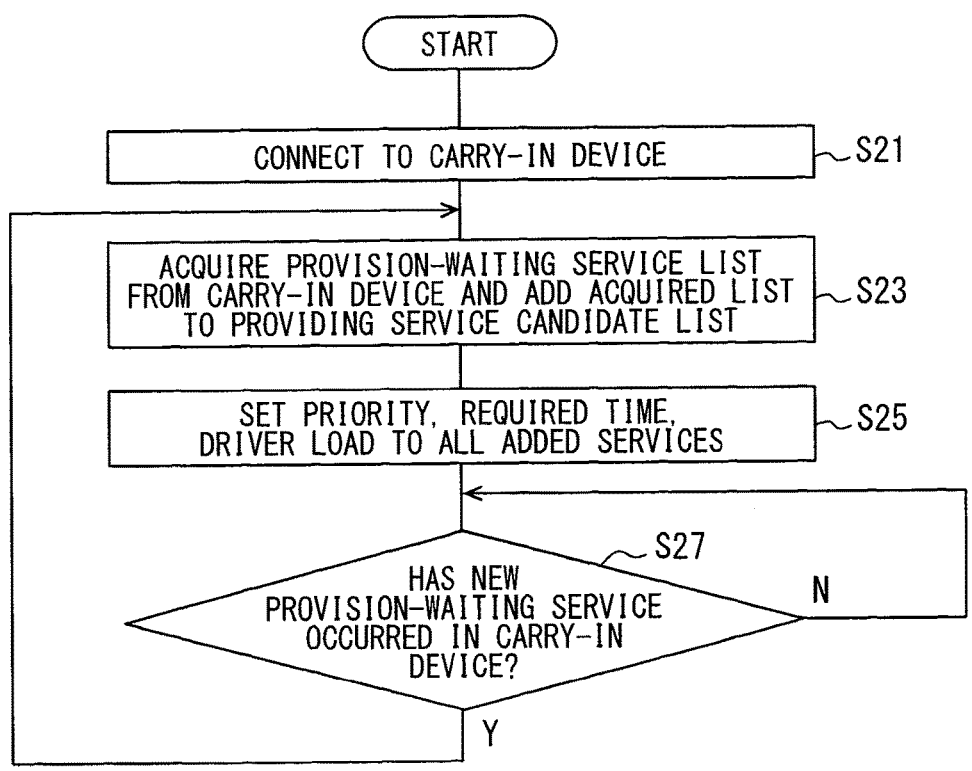
FIG. 7 is a flow chart illustrating a providing service candidate list update process in the on-vehicle device.

Next, a providing service candidate list update process as a process of the provision-waiting service acquisition unit 15 will be described with reference to FIG. 7. As illustrated in FIG. 7, in the process, communication connection with the carry-in device 50 is first performed through the short-range wireless communication unit 21 in S21. In the following S23, information of the provision-waiting service list 54A is acquired from the communicated and connected carry-in device 50, and added to the item of the provision-waiting service of the providing service candidate list. In the following S25, with respect to all added services, the priority and load of a driver are set with reference to the service-classified driver load list, and a required time that is predicted on the basis of, for example, a past history is set. In the following S27, the process is held on standby until a new provision-waiting service occurs in the carry-in device 50 (S27: N). When a new provision-waiting service occurs (S27: Y), the process shifts to S23. The providing service candidate list updated in this manner is acquired in S7.

[1-4. Effects]

According to the first embodiment described in detail above, the following effects can be obtained.

[1A] When an occurring event (driving state) to be a trigger occurs (S11: Y), and there is a service whose load is smaller than a value obtained by subtracting a load relating to the driving state from an allowable value of a driver in the providing service candidate list and a required time of the service is within a duration of the driving state (S12: Y), the service is executed. Thus, the driver can execute a pending operation of the carry-in device 50 by excellently utilizing a spare time during a ride in the vehicle.

[1B] In addition, the sum of the load relating to the driving state and the load relating to the service is equal to or less than the allowable value of the driver in all of the cognition, judgement, and operation. Thus, the safety in travel by the vehicle can be excellently ensured.

In the above embodiment, the carry-in device 50 corresponds to a portable terminal device; the short-range wireless communication unit 21 and the provision-waiting service acquisition unit 15 correspond to a carry-in state determination device; the provision-waiting service acquisition unit 15, the providing service retrieval unit 17, the process of S7, and the process of determining the presence or absence of a providing service in S12 correspond to a pending process determination device; the providing service execution unit 19, the process of S13, and a process of determining whether the providing service conforms to the duration and the like in S12 correspond to a pending process control device; the infrastructure communication unit 22, the in-vehicle communication unit 24, the navigation device 29, the occurring event detection unit 16, and the process of S9 correspond to a traveling state acquisition device; the camera 28 and the driver ability estimation unit 11 correspond to an ability acquisition device; the infrastructure communication unit 22 and the occurring event detection unit 16 correspond to a duration acquisition device; and the provision-waiting service acquisition unit 15 corresponds to a required time acquisition device.

2. Second Embodiment 2-1. Difference from First Embodiment

Figure 8:
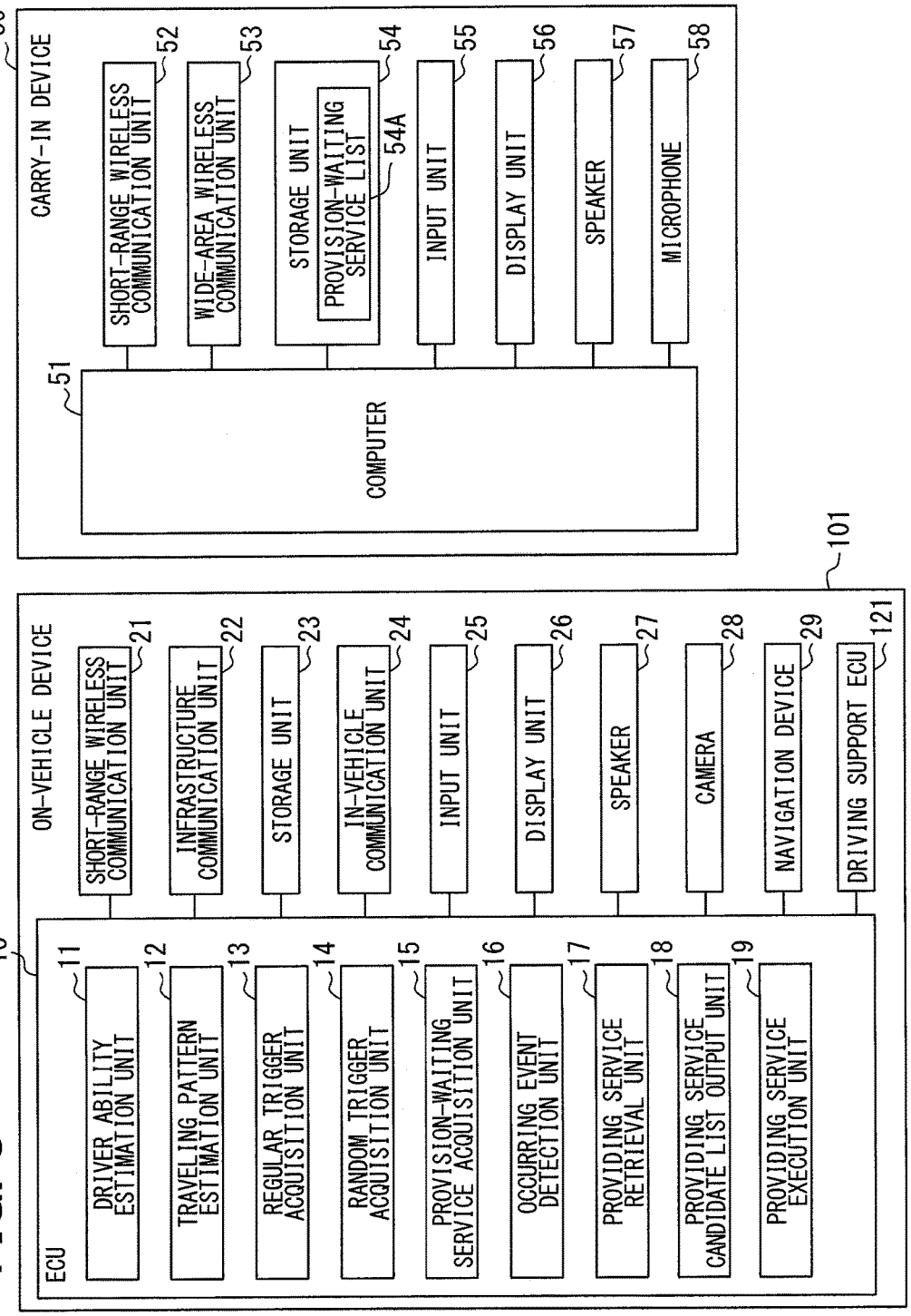
FIG. 8 is a block diagram illustrating the configuration of an on-vehicle device and the configuration of a carry-in device of a second embodiment.

As illustrated in FIG. 8, an on-vehicle device 101 as a vehicle control device of a second embodiment differs from the on-vehicle device 1 of the first embodiment in that the on-vehicle device 101 is further provided with a driving support ECU 121 in addition to the configuration of the on-vehicle device 1. The driving support ECU 121 executes kwon driving support controls such as collision avoidance, speed alarm, lane departure prevention, rear-end collision alarm, vehicular gap alarm, lane departure alarm, automatic high beam, traffic sign display, all-speed adaptive cruise control (ACC), lane keeping, lane change accident prevention, blind spot alarm, blind spot monitoring, automatic lane change, cross traffic alarm, wrong pedal operation prevention, and automatic parking. The driving support ECU 121 may be capable of executing all these driving support controls or may be capable of executing only some of these driving support controls. In the following description, the driving support ECU 121 executes a driving support control that is selected from the above various driving support controls by setting performed by a driver in any manner.

The driving support ECU 121 is connected to the ECU 10 and at least inputs data that indicates which one of the above driving support controls is executed by the driving support ECU 121 to the ECU 10.

2-2. Process

In this case, a process executed by the ECU 10 differs from the process in the first embodiment in the following manner. That is, in S12 described above (that is, the process relating to the providing service retrieval unit 17), a driving-state-classified driver load list as illustrated in FIG. 9 is referred to.

As illustrated in FIG. 9, the driving-state-classified driver load list stores a load, which is imposed on a driver by a driving state such as parking, stopping, or low-speed traveling of 10 km/h or less on an ordinary road, for each of levels of driving support in the vehicle and for each of the items of cognition, judgment, and operation in a numerical value (an example of a fourth numerical value). In FIG. 9, driving support of level 0 represents a state in which no driving support is performed by the driving support ECU 121, and a numerical value of each of the items of cognition, judgement, and operation is the same as that in the driving-state-classified driver load list of FIG. 5 in the first embodiment.

Further, driving support of level 1 represents a state in which at least collision avoidance or ACC is executed, and a numerical value of each of the items of cognition, judgement, and operation is slightly smaller than the value in the first embodiment. Driving support of level 5 represents a state in which all driving support controls that are currently predictable are executed and backup for a case when some control systems or an actuator is broken is also performed. Thus, when the level of driving support is 5, the driver is required to do substantially nothing, and all numerical values of the respective items of cognition, judgement, and operation are 0.

In this manner, when the load relating to an occurring event (driving state) is reduced by driving support, a value obtained by subtracting the load relating to the occurring event from the allowable value of the driver (that is, a load that is safely applied to operations other than driving by the driver) is increased. In S12 of the present embodiment, the presence or absence of a conformable providing service is determined according to a state in which the load relating to the occurring event is reduced by driving support by referring to the driving-state-classified driver load list as illustrated in FIG. 9.

2-3. Effects

According to the second embodiment described in detail above, the following effects are obtained in addition to the effects [1A], [1B] of the first embodiment.

[2A] In the present embodiment, in the process of S12, the presence or absence of a service that conforms to the current driving state is determined using the driving-state-classified driver load list in which numerical values are set for each of the levels of driving support in this manner. Thus, an appropriate service (that is, an appropriate pending process) according to the condition of driving support in the vehicle is executed. Thus, the driver can execute a pending operation of the carry-in device 50 by more excellently utilizing a spare time during a ride in the vehicle. In the second embodiment, the providing service retrieval unit 17 and the process of acquiring the level of driving support in S12 correspond to a support condition acquisition device.

3. Third Embodiment

3-1. Difference from First Embodiment

Figure 10:
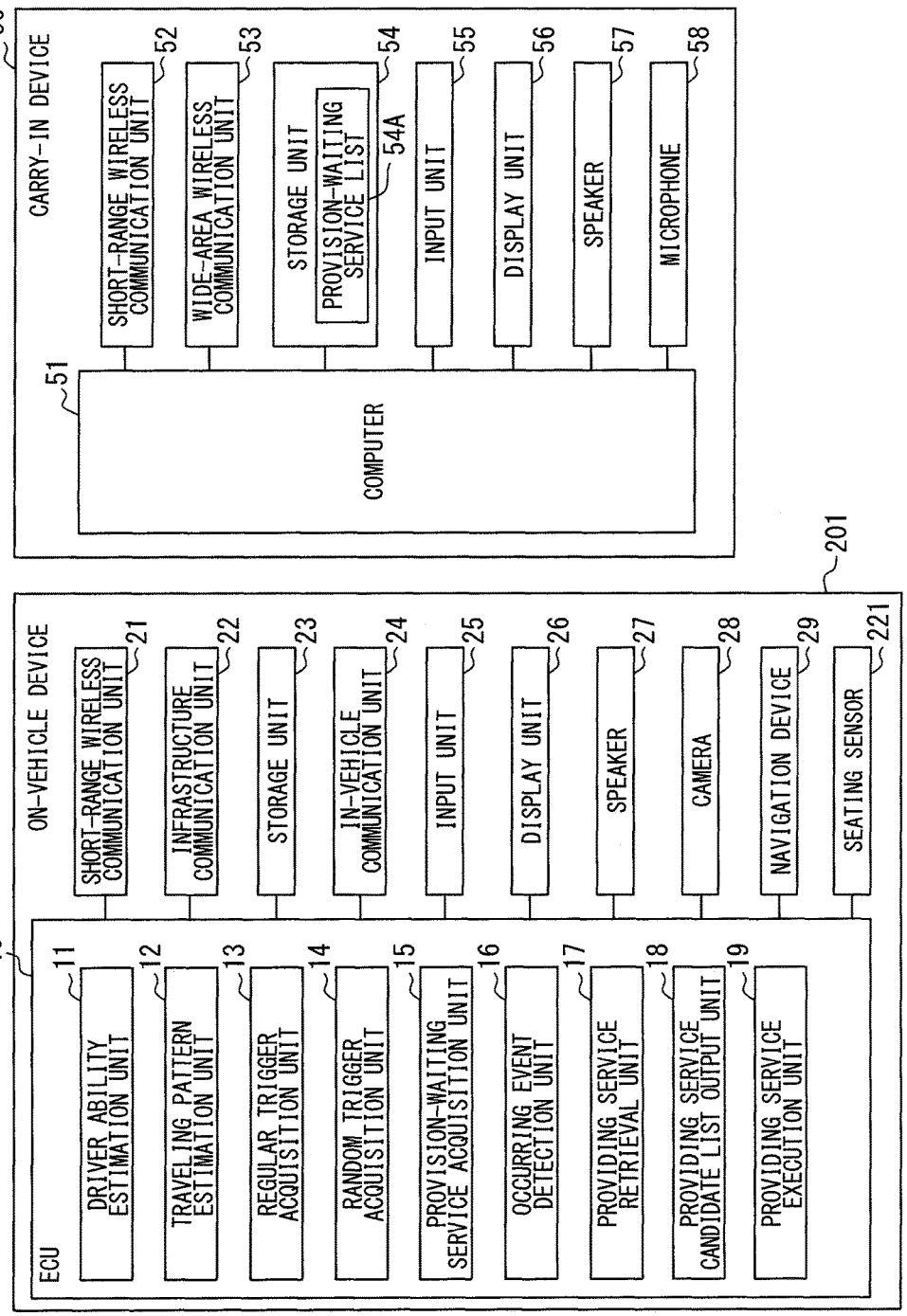
FIG. 10 is a block diagram illustrating the configuration of an on-vehicle device and the configuration of a carry-in device of a third embodiment.

As illustrated in FIG. 10, an on-vehicle device 201 as a vehicle control device of a third embodiment differs from the on-vehicle device 1 of the first embodiment in that the on-vehicle device 201 is further provided with a seating sensor 221 in addition to the configuration of the on-vehicle device 1. The seating sensor 221 detects a seated state of a passenger in each seat of the vehicle and inputs a detection result to the ECU 10.

3-2. Process

In the present embodiment, a process executed by the ECU 10 differs from the process in the first embodiment in the following respect. That is, S8 is performed between S7 and S9 as illustrated in FIG. 11, and S221 to S223 are performed between S21 and S23 as illustrated in FIG. 12.

Figure 11:
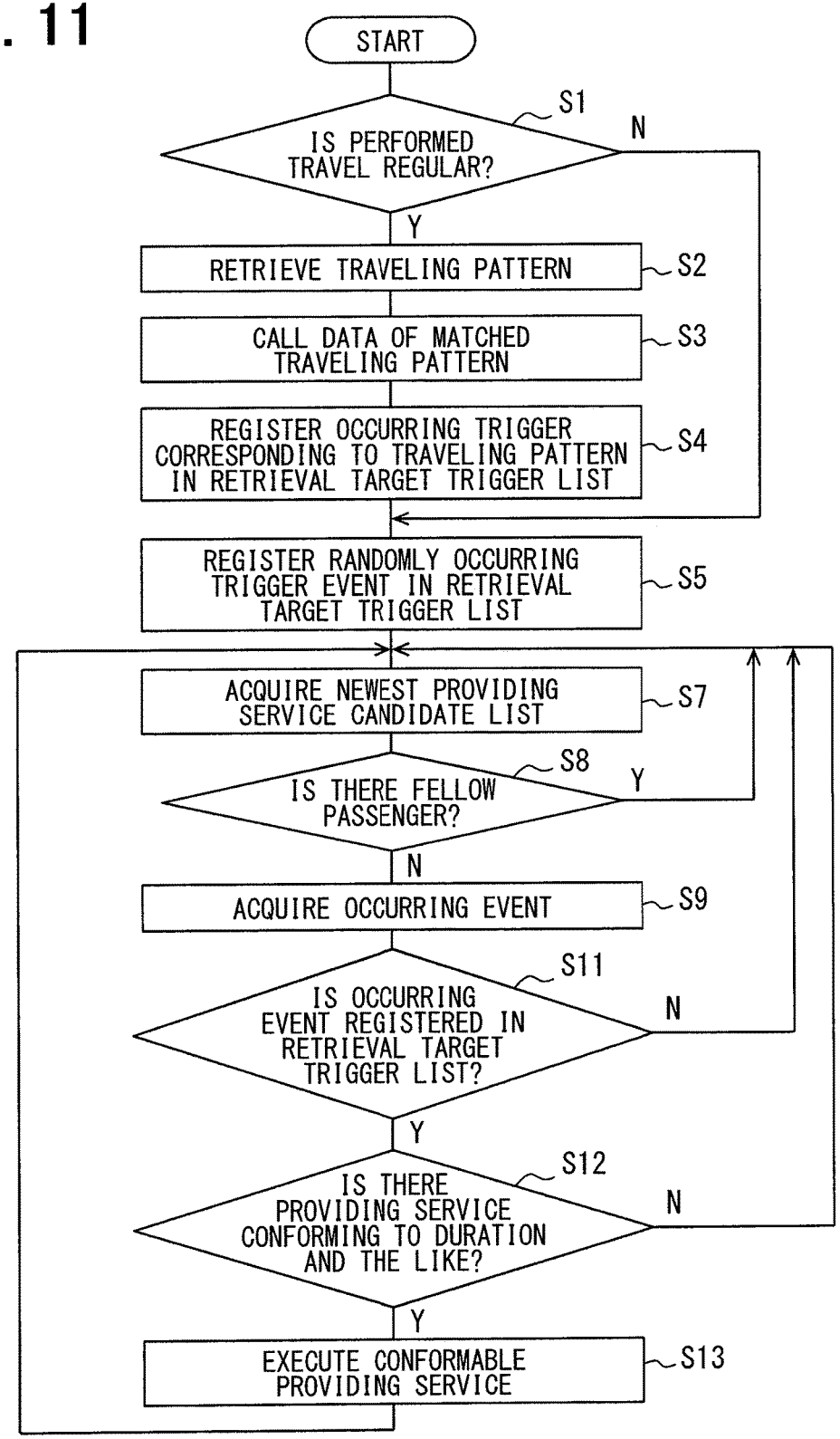
FIG. 11 is a flow chart illustrating a process in the on-vehicle device of the third embodiment as a whole.

As illustrated in FIG. 11, the newest providing service list candidate is acquired in S7. Then, in the following S8, the presence or absence of a fellow passenger (that is, a passenger other than a driver) is determined on the basis of a result of detection by the seating sensor 221. When there is no fellow passenger (S8: N), the process shifts to S9. Thus, when there is no fellow passenger (S8: N), the same process as in the first embodiment is executed. On the other hand, when there is a fellow passenger (S8: Y), the process shifts to S7. Thus, when there is a fellow passenger (S8: Y), steps after S9 are not executed, and a service (that is, a pending process) is not executed.

Figure 12:
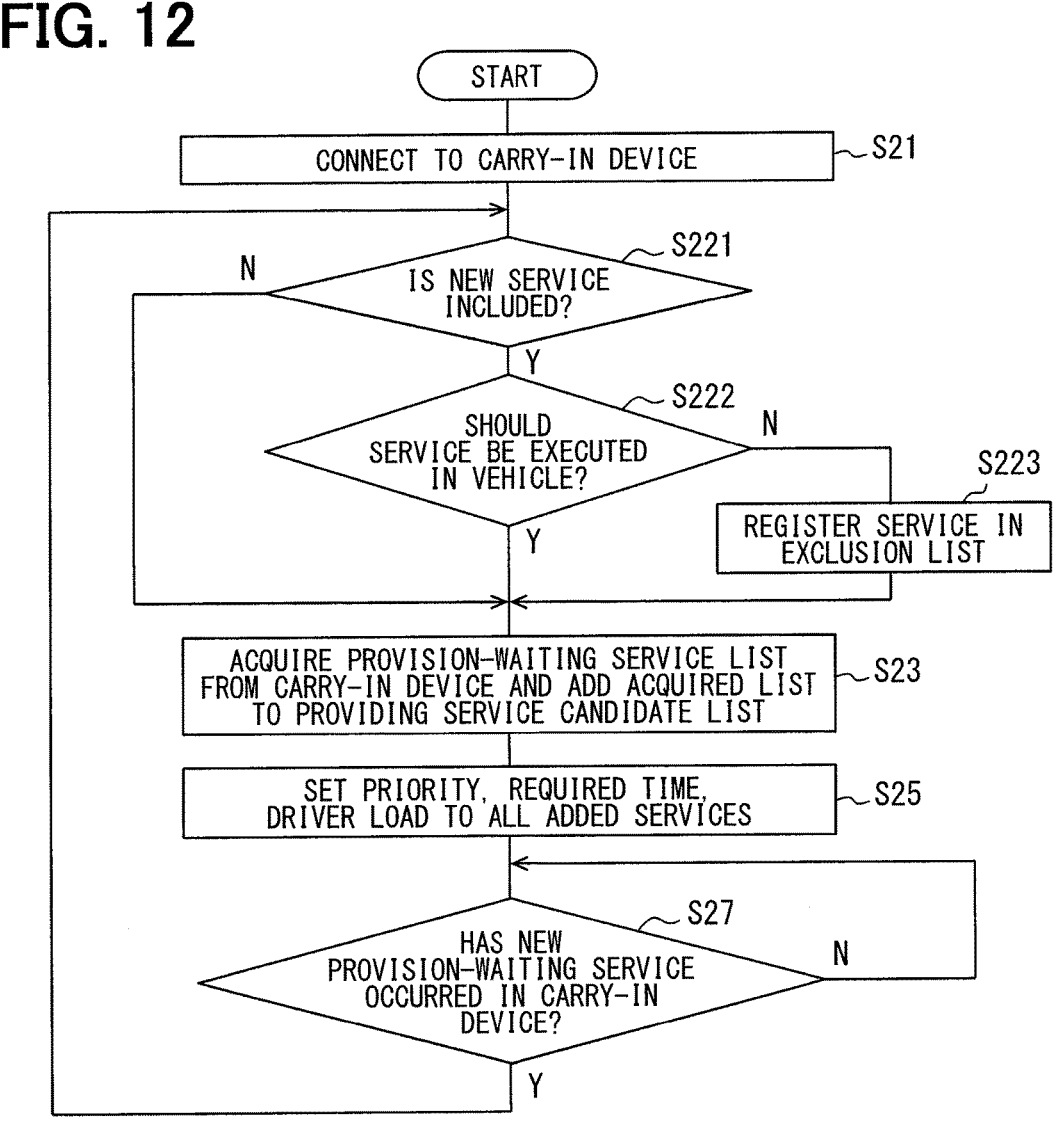
FIG. 12 is a flow chart illustrating a providing service candidate list update process in the on-vehicle device of the third embodiment.

As illustrated in FIG. 12, when connection with the carry-in device 50 is performed in S21, the provision-waiting service list 54A is referred to in order to determine whether a new service is included in the provision-waiting service list 54A in S221. The new service is a service that has a different providing source or a different form from a service that has been processed in S23 and S25. When no new service is included (S221: N), the process shifts to S23. Thus, when no new service is included in the provision-waiting services (that is, pending processes) stored in the provision-waiting service list 54A (S221: N), the same process as in the first embodiment is executed.

However, when the process is executed for the first time after the shipment of the on-vehicle device 201, all provision-waiting services are new services. Thus, in this case, an affirmative determination is made in S221, and the process shifts to S222. Also when an owner (e.g., the driver) of the carry-in device 50 subscribes to a new service or when a new service is included in the provision-waiting services stored in the provision-waiting service list 54A due to, for example, a change in an infrastructural environment (S221: Y), the process shifts to S222.

In S222, it is determined whether the new service should be executed in the vehicle. The process may be, for example, a process of displaying the new service on the display unit 26 and reading an input to the input unit 25. That is, the process may be a process of reading an input to the input unit 25 which is performed by the driver as to whether to desire the execution of the new service in the vehicle when the new service is displayed on the display unit 26. When the new service should be executed in the vehicle (S222: Y), the process shifts to S23, and steps after S23 are executed with respect to the provision-waiting services including the new service in the same manner as in the first embodiment. On the other hand, when the new service should not be executed in the vehicle (S222: N), the new service is registered in an exclusion list in S223, and the process then shifts to S23. Accordingly, the new service registered in the exclusion list is excluded from a processing object in S23 to S27. As a result, the new service registered in the exclusion list is not added to the providing service candidate list, and the new service is not executed in S13.

3-3. Effects

According to the third embodiment described in detail above, the following effects can be obtained in addition to the effects [1A], [1B] of the first embodiment.

[3A] In the present embodiment, when there is a fellow passenger (S8: Y), a provision-waiting service is not executed (S13). That is, in the present embodiment, the execution of various services is enabled on the precondition that the inside of the vehicle is an excellent private space (S13). However, when the precondition is not satisfied due to the presence of a fellow passenger (S8: Y), the service (that is, the pending process) is not executed. Thus, in the present embodiment, the utilization of a spare time during a ride in the vehicle relating to the execution of the provision-waiting service in the carry-in device 50 can be more appropriately performed.

[3B] Further, in the present embodiment, a service that should not be executed in the vehicle is registered in the exclusion list (S222, S223) so as to prevent the service from being executed in S13. Thus, for example, a service for a pedestrian such as iBeacon (registered trademark) is registered in the exclusion list so that the execution of the service is not instructed in the vehicle. Thus, in the present embodiment, the utilization of a spare time during a ride in the vehicle relating to the execution of the provision-waiting service in the carry-in device 50 can be more appropriately performed. In the present embodiment, the seating sensor 221 corresponds to a passenger detection device, and the input unit 25 and the process of S222, S223 correspond to a setting device.

4. Other Embodiments

Although the embodiments of the present disclosure have been described above, the present disclosure is not limited to the above embodiments, and may employ various forms.

[4A] In the above embodiments, in S13, a service having the highest priority among services that are registered in the providing service candidate list and conform to the duration and the like is automatically executed. However, the present disclosure is not limited thereto. For example, the affirmative or negative to execute the service may be asked to the driver, and the service may be executed when the driver approves the execution. When there are a plurality of services that conform to the duration and the like, these services may be listed on the display unit 26 in the order of priority, and a service selected by the driver from the listed services may be executed.

[4B] In the above embodiments, the on-vehicle device 1 and the carry-in device 50 communicate with each other through the short-range wireless communication units 21, 52. However, the present disclosure is not limited thereto. For example, communication between the on-vehicle device 1 and the carry-in device 50 may be performed through a wired communication unit using, for example, a USB cable.

[4C] In the driving-state-classified driver load list, a more detailed correspondence relationship between the driving state and the load on the driver may be set by taking into consideration whether automatic cruise control is being executed, the distance from another vehicle, weather conditions, or day/night difference in addition to the items illustrated in FIG. 5.

[4D] In the above embodiments, the allowable value of a driver does not change during control. However, the present disclosure is not limited thereto. For example, on the precondition that the allowable value (ability) of a driver changes from moment to moment, control may be performed using, for example, a technique of sleepiness detection.

[4E] In the above embodiments, the provision-waiting service acquisition unit 15 as the pending process determination device determines the presence or absence of a provision-waiting service by communicating with the carry-in device 50. However, the present disclosure is not limited thereto. For example, the pending process determination device may read a display surface or a pilot lamp (e.g., LED) of the portable terminal device as an image to determine whether there is a pending process.

[4F] In the above embodiments, the allowable value of a driver, the load relating to a service, and the load relating to a driving state are converted into a numerical form to determine whether the allowable value is equal to or more than the sum of the loads. However, the present disclosure is not limited thereto. For example, the loads may not be converted into a numerical form, and a multidimensional map classified into ranks such as small, medium, and large may be used. However, the conversion into a numerical form as in the above embodiments may make the process easier.

[4G] In the above embodiments, a service that should be executed is determined by referring to the allowable value of a driver, the load relating to a service, the load relating to a driving state, and the required time (duration). However, the present disclosure is not limited thereto. That is, any one or some of the allowable value of a driver, the load relating to a service, the load relating to a driving state, and the required time (duration) may not be referred to, or none of them may be referred to. In the latter case, when the carry-in device 50 has a provision-waiting service, the execution of the provision-waiting service is automatically instructed. In this case, the driver can execute an operation relating to the provision-waiting service, for example, immediately after the driver carries the carry-in device 50 into the vehicle (at this time, the vehicle is in a stopped state).

[4H] In the above embodiments, the priority is set for each service. However, the present disclosure is not limited thereto. No priority may be set in services; for example, from among services that conform to the duration and the like, a service that should be executed may be randomly selected or selected in the chronological order of time when a provision-waiting state is started.

[4I] In the second embodiment, numerical values of the driving-state-classified driver load list are set for each of the levels of driving support. However, the present disclosure is not limited thereto. For example, numerical values (subtracting values) of the respective items of cognition, judgment, and operation may be set for each of the levels of driving support, and the numerical values (subtracting values) according to the driving support level may be equally subtracted from numerical values obtained from the same driving-state-classified driver load list as the first embodiment.

[4J] In the third embodiment, a service that should not be executed in the vehicle is registered in the exclusion list in the stage (S222 to S223) prior to the execution of a provision-waiting service. However, the present invention is not limited thereto. For example, after the service is once executed by the process of S13, an operation of registering the service in the exclusion list may be enabled.

Further, similarly to the process of registration to the exclusion list, a service that should be executed in the vehicle can be registered regardless of the presence or absence of a fellow passenger. In this case, when the service is included in the providing service candidate list acquired in S7 and there is a fellow passenger, steps after S9 in FIG. 11 are executed only for the registered service. In this case, the provision of a private service may be prohibited when there is a fellow passenger, and the provision of a public service such as an advertisement may be executed regardless of the presence or absence of a fellow passenger.

[4K] In the third embodiment, the presence or absence of a fellow passenger is detected through the seating sensor 221. However, the present invention is not limited thereto. For example, the presence or absence of a fellow passenger may be detected on the basis of an image captured by the camera 28.

[4L] In the third embodiment, either the process relating to the presence or absence of a fellow passenger (S8) or the process relating to the selection of whether a service should be executed in the vehicle (S221 to S223) may be omitted. In each of the above embodiments, various loads are classified into three types: cognition, judgement, and operation. However, the control may be performed by focusing on one or two types of the loads or by focusing on a load classified by another form, for example, a value of an integral load.

[4M] A function of one constituent element in each of the above embodiments may be distributed to a plurality of constituent elements, or functions of a plurality of constituent elements may be integrated to one constituent element. At least a part of the configuration of each of the above embodiments may be replaced with a known configuration having the same function. A part of the configuration of the above embodiments may be omitted. At least a part of the configuration of one of the above embodiments may be added to or replaced with the configuration of another one of the above embodiments.

[4N] In addition to the on-vehicle device 1 described above, the present disclosure can be achieved in various forms such as a system that includes the on-vehicle device 1 as a constituent element, a program for making a computer function as the on-vehicle device 1, a medium that records the program therein, and a control method.

[4O] In each of the above embodiments, each device that constitutes the vehicle control device of the present disclosure is mounted on a vehicle as the on-vehicle device 1. However, the present disclosure is not limited thereto. For example, a part of the configuration for executing the process in each of the embodiments may be achieved by, for example, a cloud computer present outside the vehicle.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle control device comprising:
    a carry-in state determination device that determines whether a portable terminal device to be carried into a vehicle is already carried into the vehicle;
    a pending process determination device that, when the carry-in state determination device determines that the portable terminal device is already carried into the vehicle, determines whether the portable terminal device has a pending process that is held in an unexecuted state;
    a pending process control device that, when the pending process determination device determines that the portable terminal device has the pending process, enables the pending process to be executed by the portable terminal device in the vehicle;
    a traveling state acquisition device that acquires a traveling state of the vehicle;
    a duration acquisition device that acquires a duration during which the traveling state acquired by the traveling state acquisition device is continued; and
    a required time acquisition device that acquires a required time required for the execution of the pending process; wherein:
    the pending process control device enables the execution of the pending process when the pending process determination device determines that the portable terminal device has the pending process, and the required time acquired by the required time acquisition device is shorter than the duration acquired by the duration acquisition device.

2. The vehicle control device according to claim 1, further comprising:
    an ability acquisition device that acquires an ability of a driver of the vehicle, wherein:
    when the pending process determination device determines that the portable terminal device has the pending process, the pending process control device enables execution of the pending process that is allowable for the traveling state acquired by the traveling state acquisition device and the ability of the driver acquired by the ability acquisition device.

3. The vehicle control device according to claim 2, wherein:
    the pending process control device compares a first numerical value indicative of a load that is allowable for the ability of the driver acquired by the ability acquisition device, a second numerical value indicative of a load imposed on the driver by the traveling state acquired by the traveling state acquisition device, and a third numerical value indicative of a load imposed on the driver by the execution of the pending process; and
    the pending process control device enables the execution of the pending process when a sum of the load imposed on the driver by the traveling state and the load imposed on the driver by the execution of the pending process does not exceed the load allowable for the ability of the driver.

4. The vehicle control device according to claim 2, further comprising:
    a support condition acquisition device that acquires a condition of driving support in the vehicle, wherein:
    when the pending process determination device determines that the portable terminal device has the pending process, the pending process control device enables the execution of the pending process that is allowable for the traveling state acquired by the traveling state acquisition device, the ability of the driver acquired by the ability acquisition device, and the condition of driving support acquired by the support condition acquisition device.

5. The vehicle control device according to claim 4, wherein:
    the pending process control device compares a first numerical value indicative of a load that is allowable for the ability of the driver acquired by the ability acquisition device, a fourth numerical value indicative of a load imposed on the driver by the traveling state acquired by the traveling state acquisition device under a condition of driving support acquired by the support condition acquisition device, and a third numerical value indicative of a load imposed on the driver by the execution of the pending process; and
    the pending process control device enables the execution of the pending process when a sum of the load imposed on the driver by the traveling state and the load imposed on the driver by the execution of the pending process does not exceed the load allowable for the ability of the driver.

6. The vehicle control device according to claim 1, wherein:
    when the pending process determination device determines that the portable terminal device has a plurality of pending processes, and a priority is set in each of the plurality of pending processes, the pending process control device enables the plurality of pending processes to be executed in a descending order of the priority.

7. The vehicle control device according to claim 1, wherein:
    the pending process control device instructs the portable terminal device to execute the pending process to enable the execution of the pending process.

8. The vehicle control device according to claim 1, further comprising:
    a setting device that sets whether the pending process is necessary to be executed in the vehicle, wherein:
    when the pending process determination device determines that the portable terminal device has the pending process, the pending process control device enables the execution of the pending process set by the setting device as a process necessary to be executed.

9. The vehicle control device according to claim 1, further comprising:
    a passenger detection device that detects presence of a passenger other than a driver in the vehicle, wherein:
    when the pending process determination device determines that the portable terminal device has the pending process, the pending process control device enables the execution of the pending process in the vehicle based on a detection result of the passenger detection device.

10. A vehicle control device comprising:
    a short-range wireless communication unit located in a vehicle and configured to communicate with a portable terminal device;
    an infrastructure communication unit located in the vehicle and configured to communicate with an infrastructure facility outside of the vehicle;
    a navigation device located in the vehicle; and
    a control unit having a microcomputer configured to: (i) determine whether the portable terminal device has been carried into the vehicle; (ii) in response to determining that the portable terminal device has been carried into the vehicle, determine whether the portable terminal device has a pending process in an unexecuted state, the pending process in the unexecuted state including one of a missed call, an unread email, and a new news item; (iii) determine whether the vehicle is in a designated state corresponding to one of parking the vehicle, traveling at a low speed below a first speed threshold, and traveling at a constant speed above a second speed threshold; (iv) in response to determining that the vehicle is in the designated state, determining a time duration that the vehicle is expected to remain in the designated state based on information from at least one of the infrastructure communication unit and the navigation device; (v) in response to determining that the portable terminal device has the pending process in the unexecuted state and that the vehicle is in the designated state, determining a required time for execution of the pending process in the unexecuted state and determining whether the required time for execution of the pending process in the unexecuted state is shorter than the time duration that the vehicle is expected to remain in the designated state; and (vii) in response to determining that the portable terminal has the pending process in the unexecuted state and determining that the required time for execution of the pending process in the unexecuted state is shorter than the time duration that the vehicle is expected to remain in the designated state, enabling the pending process to be executed by the portable terminal device by communicating an instruction to the portable terminal device, using the short-range wireless communication unit, to execute the pending process using the short-range wireless communication unit.

11. The vehicle control device according to claim 10, wherein the infrastructure facility outside of the vehicle corresponds to at least one of a traffic light and a railroad crossing.

12. A vehicle control device comprising:
a carry-in state determination device that determines whether a portable terminal device to be carried into a vehicle is already carried into the vehicle;
a pending process determination device that, when the carry-in state determination device determines that the portable terminal device is already carried into the vehicle, determines whether the portable terminal device has a pending process that is held in an unexecuted state;
a pending process control device that, when the pending process determination device determines that the portable terminal device has the pending process, enables the pending process to be executed by the portable terminal device in the vehicle;
a traveling state acquisition device that acquires a traveling state of the vehicle;
a duration acquisition device that acquires a duration during which the traveling state acquired by the traveling state acquisition device is continued;
a required time acquisition device that acquires a required time required for the execution of the pending process; and
an ability acquisition device that acquires an ability of a driver of the vehicle; wherein:
the pending process control device enables the execution of the pending process when the pending process determination device determines that the portable terminal device has the pending process, and the required time acquired by the required time acquisition device is shorter than the duration acquired by the duration acquisition device;
when the pending process determination device determines that the portable terminal device has the pending process, the pending process control device enables execution of the pending process that is allowable for the traveling state acquired by the traveling state acquisition device and the ability of the driver acquired by the ability acquisition device;
the pending process control device compares a first numerical value indicative of a load that is allowable for the ability of the driver acquired by the ability acquisition device, a second numerical value indicative of a load imposed on the driver by the traveling state acquired by the traveling state acquisition device, and a third numerical value indicative of a load imposed on the driver by the execution of the pending process; and
the pending process control device enables the execution of the pending process when a sum of the load imposed on the driver by the traveling state and the load imposed on the driver by the execution of the pending process does not exceed the load allowable for the ability of the driver.

* * * * *